(12) United States Patent
Atlas

(10) Patent No.: US 6,236,480 B1
(45) Date of Patent: May 22, 2001

(54) SYSTEM AND METHOD FOR REDUCING RAMAN CROSS-TALK IN A DWDM TRANSPORT SYSTEM

(76) Inventor: Dogan A. Atlas, 6560 Stapleford La., Duluth, GA (US) 30155

( * ) Notice: Subject to any disclaimer, the term of this patent is extended or adjusted under 35 U.S.C. 154(b) by 0 days.

(21) Appl. No.: 09/098,674

(22) Filed: Jun. 17, 1998

Related U.S. Application Data

(60) Provisional application No. 60/083,954, filed on May 1, 1998.

(51) Int. Cl.$^7$ ................................................. H04J 14/06
(52) U.S. Cl. ........................................ 359/122; 359/130
(58) Field of Search .................................. 359/122, 130

(56) References Cited

U.S. PATENT DOCUMENTS

| | | | |
|---|---|---|---|
| 5,589,969 | * 12/1996 | Taga et al. | 359/124 |
| 5,696,614 | * 12/1997 | Ishikawa et al. | 359/124 |
| 5,841,557 | * 11/1998 | Otsuka et al. | 359/122 |
| 5,912,910 | * 6/1999 | Sanders et al. | 372/22 |
| 5,946,116 | * 8/1999 | Wu et al. | 359/117 |
| 5,995,256 | * 11/1999 | Fee | 359/125 |
| 6,005,697 | * 12/1999 | Wu et al. | 359/117 |
| 6,041,152 | * 3/2000 | Clark | 385/24 |

* cited by examiner

*Primary Examiner*—Leslie Pascal
*Assistant Examiner*—Vu Lieu
(74) *Attorney, Agent, or Firm*—Troutman Sanders LLP; Gerald R. Boss

(57) ABSTRACT

A system and method for reducing Raman cross-talk between optical signals having different wavelengths in an optical communications system. Optical signals having wavelengths $\lambda_1$, $\lambda_2$, $\lambda_3$, and $\lambda_4$, respectively, are launched into an optical fiber at the headend of the system by an optical transmitter. Each wavelength $\lambda$ is preferably separated from each adjacent wavelength by the same amount, $\Delta\lambda$. $\lambda_1$ and $\lambda_2$ have vertical polarizations and $\lambda_3$ and $\lambda_4$ have horizontal polarizations. Because there is no Raman cross-talk between orthogonally polarized optical signals, there will be no Raman cross-talk between $\lambda_1$ and $\lambda_3$, between $\lambda_2$ and $\lambda_4$, between $\lambda_1$ and $\lambda_4$, or between $\lambda_2$ and $\lambda_3$. However, there is Raman cross-talk between $\lambda_1$ and $\lambda_2$ because each is vertically polarized and also between $\lambda_3$ and $\lambda_4$ because each is horizontally polarized. The amount of Raman cross talk is minimized because the wavelength difference between vertically polarized signals $\lambda_1$ and $\lambda_2$, and also between horizontally polarized signals $\lambda_3$ and $\lambda_4$, is only $\Delta\lambda$, which is the smallest wavelength difference between adjacent optical signals.

13 Claims, 4 Drawing Sheets

| OPTICAL SIGNAL WAVELENGTH | LAUNCH POLARIZATION |
|---|---|
| $\lambda_1$ | VERTICAL ↑ |
| $\lambda_2$ | HORIZONTAL → |
| $\lambda_3$ | VERTICAL ↑ |
| $\lambda_4$ | HORIZONTAL → |

FIG.1A

| OPTICAL SIGNAL WAVELENGTH | LAUNCH POLARIZATION |
|---|---|
| $\lambda_1$ | VERTICAL ↑ |
| $\lambda_2$ | VERTICAL ↑ |
| $\lambda_3$ | HORIZONTAL → |
| $\lambda_4$ | HORIZONTAL → |

FIG.1B

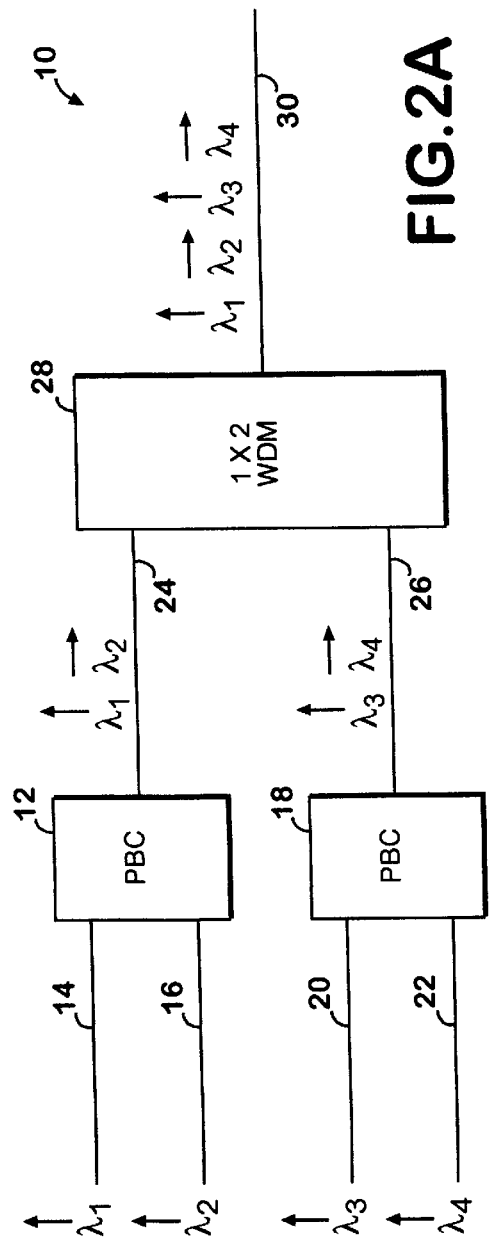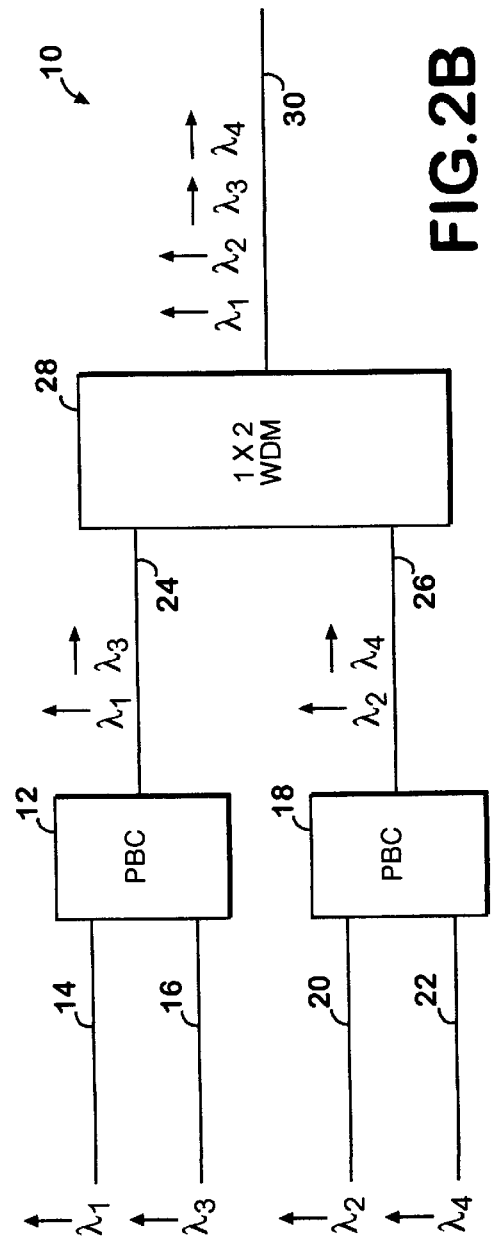

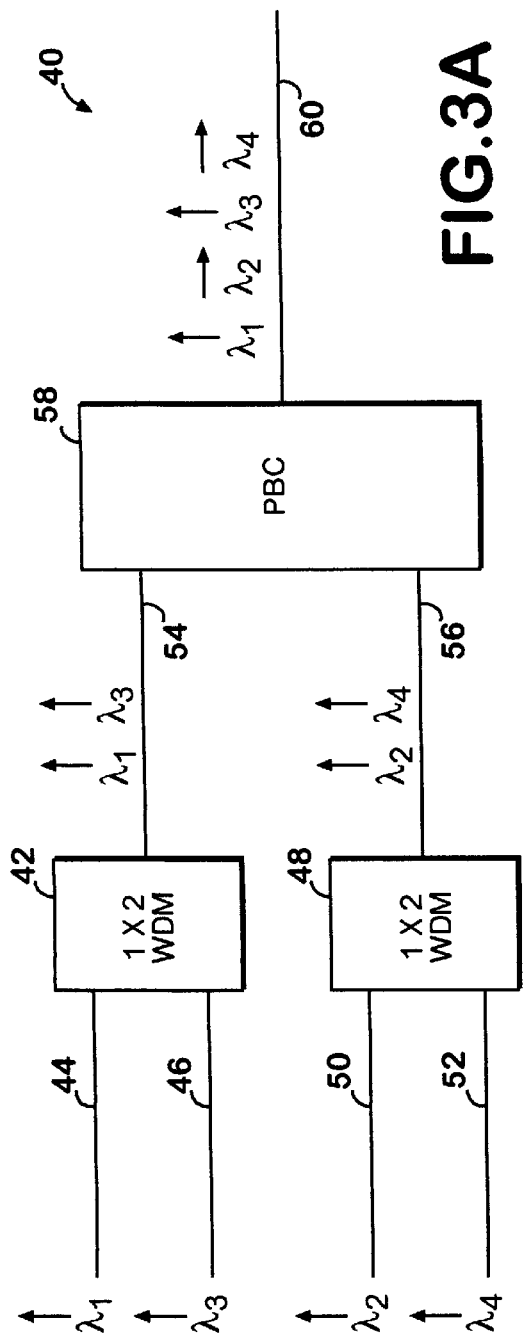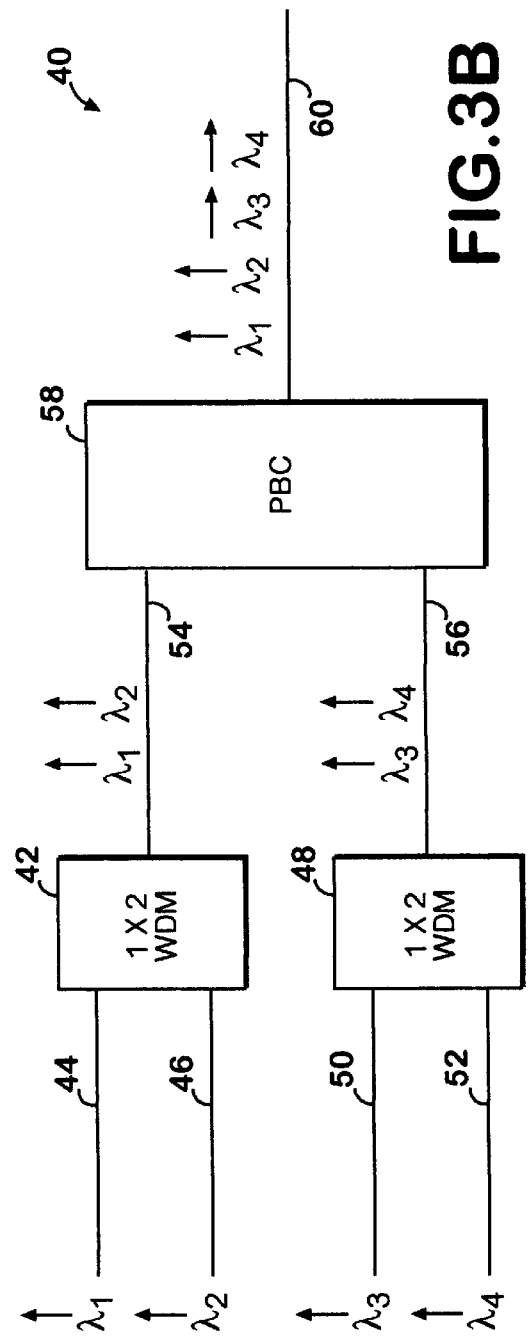

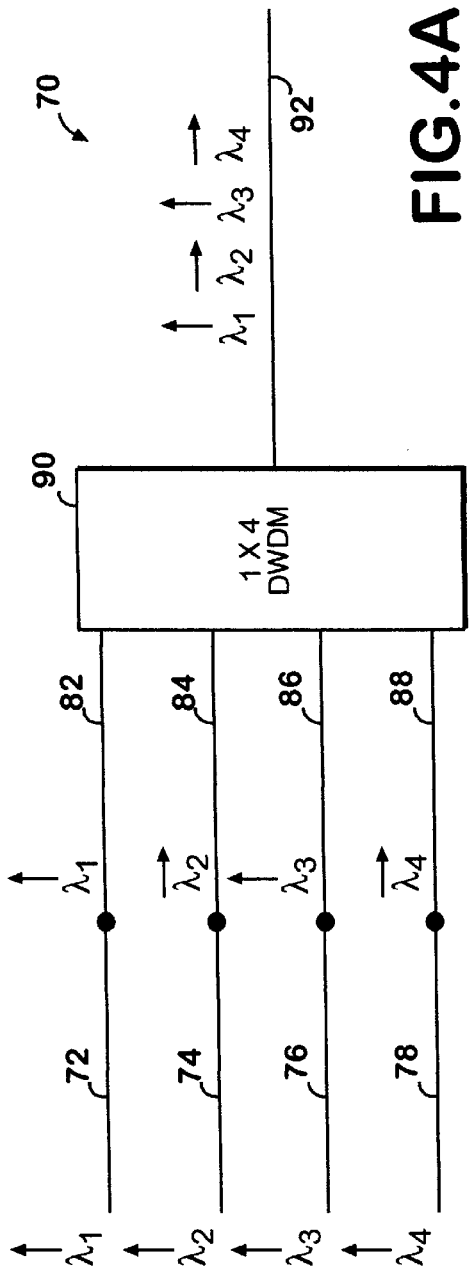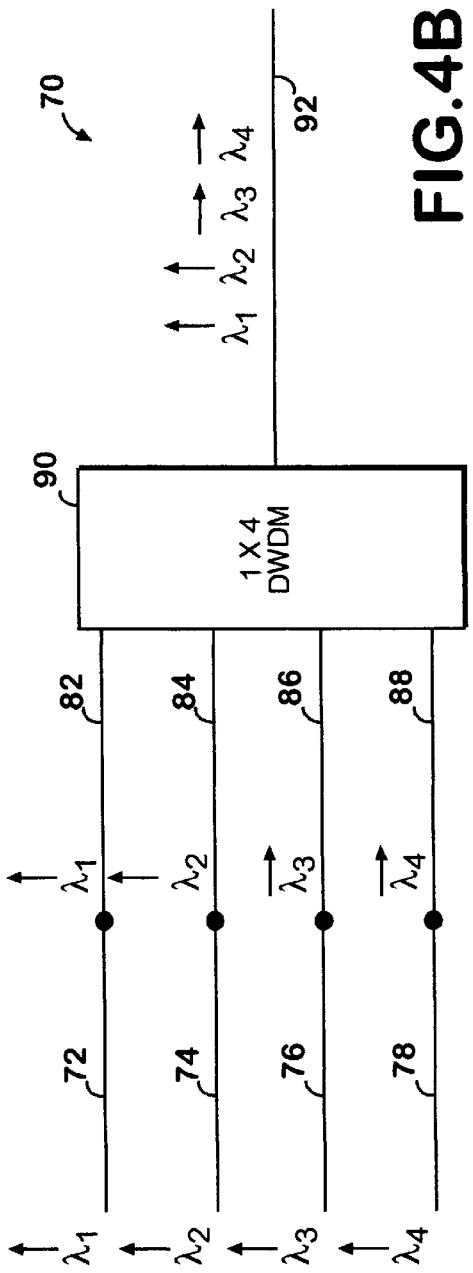

SYSTEM AND METHOD FOR REDUCING RAMAN CROSS-TALK IN A DWDM TRANSPORT SYSTEM

CROSS-REFERENCE TO RELATED APPLICATION

The present application claims the benefit of priority of U.S. Provisional Patent Application Serial No. 60/083,954, filed May 1, 1998, entitled "SRS Induced Cross Talk Improvement in DWDM CATV Transport System".

TECHNICAL FIELD

The present invention relates generally to a fiber optic communications system and, more particularly, relates to a system and method for reducing stimulated Raman scattering (SRS) cross-talk in a dense wavelength division multiplexed (DWDM) fiber optic communications system.

BACKGROUND OF THE INVENTION

In communications systems such as a CATV system, the headend is the originating point for a broadband information signal which is broadcast to subscribers. Signal sources input to the headend include over-the-air stations, satellite services, and terrestrial services, such as via microwave relay. In addition, local programming services may also be added to the broadband information signal at the headend. All of these source signals are processed and combined at the headend into an RF broadband information signal for transmission over a distribution network.

At the headend, the RF broadband information signal is converted into light and is modulated onto a light source for transport from the headend as an optical signal beam (hereafter called the "optical signal") via fiber optic cable to a plurality of nodes. At each node, the optical signal is detected by an optical receiver and is converted back into an RF broadband information signal to be provided to subscribers via coaxial cable.

At the headend, an optical transmitter launches the optical signal into a fiber optic cable for transport to subscribers. Typically, the optical signal comprises a plurality of optical signals launched at different, but closely spaced wavelengths, typically around 1550 nanometers (nm) or 1310-nm. For the purposes of this discussion, the term "wavelength" (and its designation "$\lambda$") will be used to identify an optical signal having a particular wavelength. Therefore, as used herein, the terms "optical signal" and "wavelength" should be understood to be interchangeable.

In CATV systems, there may be over 100 different wavelengths ranging from 1530 to 1560-nm launched on each fiber optic cable. Wavelengths may be stacked as close as 0.4-nm and each wavelength typically carries between 80–130 RF channels. Some wavelengths include RF channels having frequencies from 50–550 MHz or from 50–1000 MHz. Because each wavelength can carry many different channels, each wavelength can "target" a particular node, such that different wavelengths carrying different RF channels can be provided to different groups of subscribers.

In DWDM fiber optic communications systems, the optical fiber generates nonlinear effects based on launch power, fiber material characteristics, four wave mixing (FWM), and system parameters. Among these nonlinear effects is stimulated Raman scattering (SRS). When multiple optical signal beams having different wavelengths are transported on an optical fiber, SRS causes some of the energy in a lower wavelength to be transferred to the next adjacent higher wavelength. So, for example, if four wavelengths $\lambda_1$–$\lambda_4$ are launched into a fiber, with $\lambda_1$ being the lowest wavelength and $\lambda_4$ being the highest, then $\lambda_1$ would transfer some energy to $\lambda_2$, $\lambda_2$ would transfer some energy to $\lambda_3$, and $\lambda_3$ would transfer some energy to $\lambda_4$. In this manner, the energy is "uptilted" toward the higher wavelengths. Also, in analog systems, SRS causes each wavelength to modulate the other wavelengths. This phenomenon is similar to RF cross-modulation and is called SRS induced Raman cross-talk, or nonlinear optical cross-talk. For the purposes of this discussion, this phenomenon will be referred to as "Raman cross-talk".

SRS amplification occurs at high powers, typically 1–2 watts, which are not usually encountered in fiber optic communications systems. However, Raman cross-talk occurs at much lower powers, such as above 3–5 dBm, which makes the Raman cross-talk effect relevant at the low powers found in fiber optic systems. Raman cross-talk degrades the fidelity and picture quality on a subscriber's television set or monitor, and should therefore be minimized.

The magnitude of Raman cross-talk is dependent on several factors, including wavelength spacing, the number of channels, the optical power per wavelength, chromatic dispersion, and fiber length. With regard to the factor of wavelength spacing, Raman cross-talk increases with wavelength spacing up to 120-nm. An important consideration is that Raman cross-talk does not occur between two optical signals that have orthogonal states of polarization.

The polarizations of optical signals launched into an optical fiber are typically described with reference to the principal states of polarization (PSP) axes of an optical fiber. These axes are generally referred to as a fast (vertical) state of polarization and a slow (horizontal) state of polarization, which are orthogonal to each other. For the purposes of this discussion, optical signals having a vertical and horizontal polarity, respectively, are deemed to have orthogonal polarities. Optical signals are deemed to be aligned when both signals have the same polarity, whether it be vertical or horizontal. Therefore, when optical signals are aligned, Raman cross-talk is maximized, but when optical signals have orthogonal polarizations, Raman cross-talk is nulled.

In current DWDM communication systems, optical signals are launched into an optical fiber such that the orientation of the state of polarization of each optical signal is random. Therefore, the polarizations of optical signals launched into an optical fiber are typically not all the same. However, there is a high probability of all polarizations being aligned and a low probability of all polarizations being orthogonal to each other. Therefore, there is a need in the art to reduce the effect of Raman cross-talk that occurs when optical signal beams having different wavelengths are combined for transport via an optical fiber by launching the different optical signals into the fiber with orthogonal polarities. There is also a need to reduce Raman cross-talk by launching optical signals such that any Raman cross-talk that does occur will occur only between closely spaced wavelengths.

SUMMARY OF THE INVENTION

The present invention is a system and method for reducing Raman cross-talk between optical signals having different wavelengths in an optical communications system. In a first embodiment of the present invention, optical signals having wavelengths $\lambda_1$, $\lambda_2$, $\lambda_3$, and $\lambda_4$, respectively, are launched into an optical fiber at the headend of the system by an optical transmitter. Each wavelength $\lambda$ is preferably separated from each adjacent wavelength by the same amount, $\Delta\lambda$, which is preferably approximately 2-nm. $\lambda_1$ has a vertical polarization, $\lambda_2$ has a horizontal polarization, $\lambda_3$ has a vertical polarization, and $\lambda_4$ has a horizontal polarization. Therefore, $\lambda_1$ and $\lambda_2$ have orthogonal polarizations, and $\lambda_3$ and $\lambda_4$ also have orthogonal polarizations. Similarly, $\lambda_1$ and $\lambda_4$ have orthogonal polarizations and $\lambda_2$ and $\lambda_3$ also have orthogonal polarizations. Because there is no Raman cross-talk between orthogonally polarized optical signals, there will be no Raman cross-talk between $\lambda_1$ and $\lambda_2$, between $\lambda_3$ and $\lambda_4$, between $\lambda_1$ and $\lambda_4$, or between $\lambda_2$ and $\lambda_3$. However, there will be Raman cross-talk between $\lambda_1$ and $\lambda_3$ because both are vertically polarized. Similarly, there will be Raman cross-talk between $\lambda_2$ and $\lambda_4$ because both are horizontally polarized.

The amount of Raman cross-talk between $\lambda_1$ and $\lambda_3$, and similarly between $\lambda_2$ and $\lambda_4$, will be based in part on the difference between their wavelengths, $2\Delta\lambda$. However, this Raman cross-talk effect is substantially less than the amount of Raman cross-talk that would occur if the polarizations of each optical signal $\lambda_1$–$\lambda_4$ was the same.

In a second embodiment of the present invention, $\lambda_1$ and $\lambda_2$ have vertical polarizations and $\lambda_3$ and $\lambda_4$ have horizontal polarizations. Therefore, $\lambda_1$ and $\lambda_3$ have orthogonal polarizations, and $\lambda_2$ and $\lambda_4$ also have orthogonal polarizations. Similarly, $\lambda_1$ and $\lambda_4$ have orthogonal polarizations, as do $\lambda_2$ and $\lambda_3$. Because there is no Raman cross-talk between orthogonally polarized optical signals, there will be no Raman cross-talk between $\lambda_1$ and $\lambda_3$, between $\lambda_2$ and $\lambda_4$, between $\lambda_1$ and $\lambda_4$, or between $\lambda_2$ and $\lambda_3$. However, there will be Raman cross-talk between $\lambda_1$ and $\lambda_2$ because both are vertically polarized and there will be Raman cross-talk between $\lambda_3$ and $\lambda_4$ because both are horizontally polarized.

The amount of Raman cross-talk is reduced to an even smaller level than that provided by the first embodiment because the wavelength difference between vertically polarized signals $\lambda_1$ and $\lambda_2$, and also between horizontally polarized signals $\lambda_3$ and $\lambda_4$, is only $\Delta\lambda$, which is the smallest wavelength difference between adjacent signals.

BRIEF DESCRIPTION OF THE DRAWINGS

FIGS. 1A and 1B show the launch polarities of optical signals having adjacent wavelengths, in accordance with a first and second embodiment, respectively, of the present invention.

FIGS. 2A and 2B show a first optical system for implementing the first and second embodiments, respectively, of the present invention.

FIGS. 3A and 3B show a second optical system for implementing the first and second embodiments, respectively, of the present invention.

FIGS. 4A and 4B show a third optical system for implementing the first and second embodiments, respectively, of the present invention.

DETAILED DESCRIPTION OF THE PREFERRED EMBODIMENTS

The present invention includes a system and method for launching optical signals having different wavelengths with orthogonal polarities into an optical fiber. The present invention reduces Raman cross-talk by launching these optical signals such that any Raman cross-talk that occurs between optical signals having the same polarities will occur only between optical signals having closely spaced wavelengths.

The invention will be described herein with reference to optical signals having four different wavelengths, $\lambda_1$, $\lambda_2$, $\lambda_3$, and $\lambda_4$, each of which is separated from each adjacent wavelength by at least a certain amount, $\Delta\lambda$. Thus, for the purposes of this discussion, $\lambda_1+\Delta\lambda=\lambda_2$; $\lambda_2+\Delta\lambda=\lambda_3$; and $\lambda_3+\Delta\lambda=\lambda_4$. For an optical communications system using optical transmitters at the headend that transmit at about 1550-nm, $\Delta\lambda$ may be approximately 2-nm. However, the present invention is not limited to only four optical signals, but can be implemented with any number of optical signals transported on a fiber optic cable, such that $\lambda_n+\Delta\lambda=\lambda_{n+1}$.

At the headend of a typical CATV communications system, optical signals are launched by a transmitter into an optical fiber. In prior systems, the polarities of each of the launched optical signals is random, but there is a high probability of all polarizations being aligned and a low probability of all polarizations being orthogonal to each other. As referred to above, the polarizations of optical signals launched into an optical fiber are typically described with reference to the principal states of polarization (PSP) axes of an optical fiber, i.e., a fast (vertical) state of polarization and a slow (horizontal) state of polarization, which are orthogonal to each other. For the purposes of this discussion, optical signals will be referred to as having either vertical or horizontal polarizations. However, this designation of polarities is for convenience of discussion only and it will be understood by those skilled in the art that the actual polarization of optical signals may vary from the vertical or horizontal PSP axes, but such polarizations of signals can still be aligned or orthogonal to each other. Also, the polarizations of optical signals may vary as the signals travel down the optical fiber.

As discussed above, launching optical signals with aligned polarities causes Raman cross-talk to occur, which is undesirable. To reduce the effect of Raman cross-talk, the present invention launches optical signals with orthogonal polarizations. The method of the present invention should reduce Raman cross-talk in fiber optic transport systems by 6 dB.

It should be understood that for the purposes of this discussion, any reference to a wavelength $\lambda$ should be interpreted as a reference to an optical signal that has a wavelength of $\lambda$. Therefore, optical signals are identified and referred to herein by their respective wavelengths, $\lambda$.

The present invention will now be described with reference to the drawing figures, wherein like reference numerals represent like parts throughout the several views. Referring now to FIG. 1A, in accordance with a first embodiment of the present invention, optical signals having wavelengths $\lambda_1$, $\lambda_2$, $\lambda_3$, and $\lambda_4$, respectively, are launched into an optical fiber by an optical transmitter at the headend. $\lambda_1$ has a vertical polarization, as designated by a vertical arrow. $\lambda_2$ has a horizontal polarization, as designated by a horizontal arrow. $\lambda_3$ has a vertical polarization, and $\lambda_4$ has a horizontal polarization. Therefore, $\lambda_1$ and $\lambda_2$ have orthogonal polarizations, and $\lambda_3$ and $\lambda_4$ also have orthogonal polarizations. Similarly, $\lambda_1$ and $\lambda_4$ have orthogonal polarizations and $\lambda_2$ and $\lambda_3$ also have orthogonal polarizations. Because there is no Raman cross-talk between orthogonally polarized optical signals, there will be no Raman cross-talk between $\lambda_1$ and $\lambda_2$, between $\lambda_3$ and $\lambda_4$, between $\lambda_1$ and $\lambda_4$, or between $\lambda_2$ and $\lambda_3$. However, there will be Raman cross-talk between $\lambda_1$ and $\lambda_3$ because both are vertically polarized. Similarly, there will be Raman cross-talk between $\lambda_2$ and $\lambda_4$ because both are horizontally polarized.

As discussed above, the amount of Raman cross-talk is dependent, in part, on the wavelength difference between optical signals having the same polarity. The wavelength difference between vertically polarized signals $\lambda_1$ and $\lambda_3$ is $2\Delta\lambda$, because the difference between $\lambda_1$ and $\lambda_2$ is $\Delta\lambda$, and the difference between $\lambda_2$ and $\lambda_3$ is also $\Delta\lambda$. Therefore, the amount of Raman cross-talk between $\lambda_1$ and $\lambda_3$, and similarly between $\lambda_2$ and $\lambda_4$, will be based in part on the difference between their wavelengths, $2\Delta\lambda$. However, this Raman cross-talk effect is substantially less than the amount of Raman cross-talk that would occur if the polarizations of each optical signal $\lambda_1$–$\lambda_4$ was the same.

A second embodiment of the present invention will now be described with reference to FIG. 1B. The same four optical signals $\lambda_1$, $\lambda_2$, $\lambda_3$, and $\lambda_4$ are provided, with $\lambda_1$ and $\lambda_2$ having vertical polarizations and $\lambda_3$ and $\lambda_4$ having horizontal polarizations. Therefore, $\lambda_1$ and $\lambda_3$ have orthogonal polarizations, and $\lambda_2$ and $\lambda_4$ also have orthogonal polarizations. Similarly, $\lambda_1$ and $\lambda_4$ have orthogonal polarizations, as do $\lambda_2$ and $\lambda_3$. Because there is no Raman cross-talk between orthogonally polarized optical signals, there will be no Raman cross-talk between $\lambda_1$ and $\lambda_3$, between $\lambda_2$ and $\lambda_4$, between $\lambda_1$ and $\lambda_4$, or between $\lambda_2$ and $\lambda_3$. However, there will be Raman cross-talk between $\lambda_1$ and $\lambda_2$ because both are vertically polarized and there will be Raman cross-talk between $\lambda_3$ and $\lambda_4$ because both are horizontally polarized.

The amount of Raman cross-talk that remains when the second embodiment of the present invention is implemented is minimized because the difference in wavelengths between vertically polarized signals $\lambda_1$ and $\lambda_2$, and also between horizontally polarized signals $\lambda_3$ and $\lambda_4$, is only $\Delta\lambda$, which is the smallest wavelength difference that is permitted between adjacent signals. Therefore, the Raman cross-talk effect between $\lambda_1$ and $\lambda_2$, and also between $\lambda_3$ and $\lambda_4$, will be minimized even more than as described with reference to FIG. 1A because it is based on the smallest wavelength difference, $\Delta\lambda$.

The present invention is not limited to only four optical signals, but may be implemented for any number of optical signals. For example, if eight optical signals $\lambda_1$–$\lambda_8$ were launched, then in accordance with the second embodiment of the present invention $\lambda_1$–$\lambda_4$ would have vertical polarizations and $\lambda_5$–$\lambda_8$ would have horizontal polarizations. The first embodiment of the present invention could also be implemented, but an example of such implementation will not be presented here for the sake of brevity. In this manner, Raman cross-talk would not occur between the orthogonally polarized signals, but would occur between each vertically polarized wavelength $\lambda_1$–$\lambda_4$ and between each horizontally polarized wavelength $\lambda_5$–$\lambda_8$. However, the wavelengths between which Raman cross-talk would occur (i.e., $\lambda_1$–$\lambda_4$ and $\lambda_5$–$\lambda_8$) are adjacent to each other with the minimum $\Delta\lambda$ spacing between each adjacent wavelength, thereby minimizing the Raman cross-talk effect. Those skilled in the art will recognize that the embodiments of the present invention can be implemented for any number of optical signals in a manner similar to that described above.

Various examples of systems on which the method of reducing Raman cross-talk can be implemented are shown in FIGS. 2A–4B. An example of a first system 10 for implementing the present invention having the optical signals described with reference to FIG. 1A is shown in FIG. 2A. System 10 is preferably embodied in an optical transmitter at the headend. Optical signals having wavelengths $\lambda_1$ and $\lambda_2$ are input to a first polarization beam combiner (PBC) 12 on input optical fibers 14 and 16, respectively. Each input fiber 14 and 16 is a polarization maintaining fiber (PMF), which maintains the polarization of the optical signal. Similarly, $\lambda_3$ and $\lambda_4$ are input to a second polarization beam combiner (PBC) 18 on input optical fibers 20 and 22, respectively, each of which is a PMF. Each of the signals, $\lambda_1$, $\lambda_2$, $\lambda_3$, and $\lambda_4$ has a vertical polarization. The vertical and horizontal arrows above each $\lambda$ in the figures designates the polarization of each signal at particular locations in the system.

$\lambda_1$ and $\lambda_2$ are combined by PBC 12 and are output on fiber 24, which is also a PMF. The PBC 12 outputs $\lambda_1$ as a vertically polarized optical signal, but converts $\lambda_2$ to a horizontally polarized signal. Similarly, $\lambda_3$ and $\lambda_4$ are combined by PBC 18 and are output on PMF fiber 26. PBC 18 outputs $\lambda_3$ as vertically polarized, and outputs $\lambda_4$ as horizontally polarized.

The signals on fibers 24 and 26 are then input to a dense wavelength division multiplexer (DWDM) 28, which combines and launches the signals into fiber 30, which is a single mode fiber (SMF). An optical coupler can be used instead of the DWDM 28; however, the DWDM is preferable because it has less insertion loss than an optical coupler.

Single mode fiber (SMF) such as fiber 30 does not maintain the polarization of the signals. However, this is not critical because the polarization of each signal in a SMF changes equally such that there is no change of polarization relative to the polarization of each other signal. Thus, signals having orthogonal polarizations relative to one another will be maintained orthogonal to one another during transport in the single mode fiber, even though the actual polarization of each signal may change in the SMF. The effect of Raman cross-talk typically occurs within the first 20 kilometers (km) of the fiber 30, but by launching wavelengths into the SMF orthogonal to one another in accordance with the present invention, the effect is minimized.

The same system, shown in FIG. 2B, can also implement the second embodiment of the present invention having the optical signals described with reference to FIG. 1B. To implement the second embodiment of the present invention, different wavelengths are provided on the input fibers 16 and 20 as compared to the system of FIG. 2A. In FIG. 2B, $\lambda_1$ is provided on input fiber 14, $\lambda_3$ is provided on input fiber 16, $\lambda_2$ is provided on input fiber 20, and $\lambda_4$ is provided on input fiber 22. After being output from PBC 12, $\lambda_1$ is vertically polarized and $\lambda_3$ is horizontally polarized. After being output from PBC 18, $\lambda_2$ is vertically polarized and $\lambda_4$ is horizontally polarized. Therefore, upon being combined and launched into fiber 30 by DWDM 28, there will be Raman cross-talk between vertically polarized wavelengths $\lambda_1$ and $\lambda_2$, and there will also be Raman cross-talk between horizontally polarized wavelengths $\lambda_3$ and $\lambda_4$.

A second example of a system for implementing the present invention is shown in FIGS. 3A and 3B, respectively. In this system, the PBC is utilized after the optical signals have been combined by wavelength division multiplexers. As shown in FIG. 3A, the system 40, preferably embodied in an optical transmitter at the headend, implements the first embodiment of the present invention having the optical signals shown in FIG. 1A. $\lambda_1$ is input to WDM 42 on input fiber 44, $\lambda_3$ is input to WDM 42 on input fiber 46, $\lambda_2$ is input to a wavelength division multiplexer (WDM) 48 on input fiber 50, and $\lambda_4$ is input to WDM 48 on input fiber 52. Each input fiber 44, 46, 50, and 52 is a PMF and each of wavelengths $\lambda_1$–$\lambda_4$ on such fibers is vertically polarized.

WDM 42 combines $\lambda_1$ and $\lambda_3$ and outputs both wavelengths on PMF fiber 54. Each wavelength $\lambda_1$ and $\lambda_3$ output on PMF fiber 54 remains vertically polarized. Similarly, WDM 48 combines $\lambda_2$ and $\lambda_4$ and outputs the signals on PMF fiber 56. Each wavelength $\lambda_2$ and $\lambda_4$ on PMF fiber 56 also remains vertically polarized. Each wavelength on fibers 54 and 56 are input to PBC coupler 58, which combines and launches each signal into fiber 30. When output from PBC 58, both $\lambda_1$ and $\lambda_3$ remain vertically polarized and $\lambda_2$ and $\lambda_4$ are changed by the PBC to a horizontally polarization. Thus, there will be a Raman cross-talk effect between $\lambda_1$ and $\lambda_3$, and between $\lambda_2$ and $\lambda_4$, each of which is separated by $2\Delta\lambda$.

The same system, shown in FIG. 3B, can also be used to implement the second embodiment of the present invention having the optical signals described with reference to FIG. 1B. As shown in FIG. 3B, $\lambda_1$ is input on fiber 44, $\lambda_2$ is input on fiber 46, $\lambda_3$ is input on fiber 50, and $\lambda_4$ is input on fiber 52. In this manner, when launched into fiber 60, $\lambda_1$ and $\lambda_2$ will be vertically polarized, and $\lambda_3$ and $\lambda_4$ will be horizontally polarized. This will cause a Raman cross-talk effect between $\lambda_1$ and $\lambda_2$, and between $\lambda_3$ and $\lambda_4$, each of which is separated by only $\Delta\lambda$.

A third example of a system for implementing the present invention as described with reference to FIGS. 1A and 1B is shown in FIGS. 4A and 4B, respectively. The system 70, shown in FIGS. 4A and 4B, is preferably embodied in an optical transmitter at the headend. System 70 does not include a PBC, as do the systems shown in FIGS. 2A–B and FIGS. 3A–B. As shown in the system 70 of FIG. 4A, $\lambda_1$, $\lambda_2$, $\lambda_3$, and $\lambda_4$ are input on fibers 72, 74, 76, and 78, respectively. Fibers 74 and 78 are orthogonally spliced to fibers 84 and 88, respectively. Orthogonal splicing, as is known in the art, uses polarization maintaining splices and changes the polarization of the optical signal on the fiber, such as from vertical polarization to horizontal polarization. Fibers 72 and 76 are spliced to fibers 82 and 86, respectively; however, these splices are not orthogonal splices. Each fiber 82, 84, 86, and 88 are PMFs.

The signals on fibers 82, 84, 86, and 88 are then input to a DWDM 90 or, alternatively, to an optical coupler. It will be understood that, when input to DWDM 90, $\lambda_1$ is vertically polarized, $\lambda_2$ is horizontally polarized, $\lambda_3$ is vertically polarized, and $\lambda_4$ is horizontally polarized. The DWDM 90 combines the signals and launches each of them into fiber 92 with each wavelength having the same polarization as when input to the DWDM. Therefore, there is Raman cross-talk effect between $\lambda_1$ and $\lambda_3$, and also between $\lambda_2$ and $\lambda_4$, each of which are separated by $2\Delta\lambda$.

To implement the second embodiment of the present invention on the system 70 shown in FIG. 4B, fibers 72 and 74 are spliced, but not orthogonally spliced, to fibers 82 and 84, respectively. Fibers 76 and 78 are orthogonally spliced to fibers 86 and 88, respectively. It will be understood that this causes $\lambda_1$ and $\lambda_2$ to be launched with vertical polarizations, and causes $\lambda_3$ and $\lambda_4$ to be launched with horizontal polarizations. Therefore, there is Raman cross-talk effect between $\lambda_1$ and $\lambda_2$, and also between $\lambda_3$ and $\lambda_4$. This Raman cross-talk effect is minimized because it occurs between wavelengths that are separated only by $\Delta\lambda$.

While the invention has been disclosed in preferred forms, it will be apparent to those skilled in the art that many modifications, additions, and deletions can be made without departing from the spirit and scope of the invention as set forth in the following claims.

What is claimed is:

1. A method for launching a plurality of optical signals having different wavelengths into an optical fiber for transport through a communications system, comprising the steps of:
   launching a first optical signal having a first wavelength $\lambda_1$ into the fiber, wherein said first optical signal has a first polarization;
   launching a second optical signal having a second wavelength $\lambda_2$ into the fiber, wherein said second wavelength $\lambda_2$ is adjacent to said first wavelength $\lambda_1$, wherein said second optical signal has a first polarization;
   launching a third optical signal having a third wavelength $\lambda_3$ into the fiber, wherein said third wavelength $\lambda_3$ is adjacent to said second wavelength $\lambda_2$, wherein said third optical signal has a second polarization orthogonal to said first polarization; and
   launching a fourth optical signal having a fourth wavelength $\lambda_4$ into the fiber, wherein said fourth wavelength $\lambda_4$ is adjacent to said third wavelength $\lambda_3$, wherein said fourth optical signal has a second polarization orthogonal to said first polarization.

2. The method of claim 1 wherein said first polarization is vertical and said second polarization is horizontal.

3. The method of claim 1 wherein said fiber is a polarization maintaining fiber.

4. A method for launching a plurality of optical signals having different wavelengths into an optical fiber for transport through a communications system comprising the steps of:
   launching a first optical signal having a first wavelength $\lambda_1$ into the fiber, wherein said first optical signal has a first polarization;
   launching a second optical signal having a second wavelength $\lambda_2$ into the fiber, wherein said second optical signal has a first polarization;
   launching a third optical signal having a third wavelength $\lambda_3$ into the fiber, wherein said third optical signal has a second polarization orthogonal to said first polarization; and
   launching a fourth optical signal having a fourth wavelength $\lambda_4$ into the fiber, wherein said fourth optical signal has a second polarization orthogonal to said first polarization;
   wherein each of the plurality of optical signals is separated form each respective adjacent optical signal by at least a predetermined wavelength $\Delta\lambda$, such at $\Delta\lambda_1 + \Delta\lambda = \Delta\lambda_2$; $\lambda_2 + \Delta\lambda = \Delta\lambda_3$; and $\Delta\lambda_3 + \Delta\lambda = \Delta\lambda_4$.

5. The method of claim 4 wherein $\Delta\lambda$ is approximately 2 nanometers.

6. The method of claim 4 wherein Raman cross-talk exists between said first and second optical signals and between said third and fourth optical signals, and wherein the difference in wavelength between said first and second optical signals and also between said third and fourth optical signals is $\Delta\lambda$.

7. An optical transmitter for launching a plurality of optical signals having different wavelengths into a single optical fiber for transport through a communications system, comprising:
   means for launching a first optical signal having a first wavelength $\lambda_1$ into the fiber, wherein said first optical signal has a first polarization;
   means for launching a second optical signal having a second wavelength $\lambda_2$ into the fiber, wherein said second wavelength $\lambda_2$ is adjacent to said first wavelength $\lambda_1$, wherein said second optical signal has a first polarization;
   means for launching a third optical signal having a third wavelength $\lambda_3$ into the fiber, wherein said third wavelength $\lambda_3$ is adjacent to said second wavelength $\lambda_2$, wherein said third optical signal has a second polarization orthogonal to said first polarization; and means for launching a fourth optical signal having a fourth wavelength $\lambda_4$ into the fiber, wherein said fourth wavelength $\lambda_4$ is adjacent to said third wavelength $\lambda_3$, wherein said fourth optical signal has a second polarization orthogonal to said first polarization.

8. The optical transmitter of claim 7 wherein said means comprises a polarization beam combiner (PBC) and a wavelength division multiplexer (WDM).

9. The optical transmitter of claim 8 wherein:

said first and third optical signals are input on separate input fibers to a first PBC and output from said first PBC on a first PBC output fiber;

said second and fourth optical signals are input on separate input fibers to a second PBC and output from said second PBC on a second PBC output fiber;

said first and second PBC output fibers are input to said WDM; and said WDM outputs each optical signal on said single fiber.

10. The optical transmitter of claim 8 wherein:

said first and second optical signals are input on separate input fibers to a first WDM and output from said first WDM on a first WDM output fiber;

said third and fourth optical signals are input on separate input fibers to a second WDM and output from said second WDM on a second WDM output fiber;

said first and second WDM output fibers are input to a PBC; and said PBC outputs each optical signal on said single fiber.

11. The optical transmitter of claim 7 wherein:

said first and second optical signals are input on separate input fibers to a DWDM;

said third and fourth optical signals are input on separate fibers that are each orthogonally spliced to separate respective input fibers, which are then input to said DWDM; and said DWDM outputs each optical signal on said single fiber.

12. A method for launching a plurality of optical signals having different wavelengths into an optical fiber for transport through a communications system, comprising the steps of:

launching a first group of optical signals having wavelengths $\lambda_1$ through $\lambda_n$ into the fiber, wherein said first group of optical signals have a first polarization; and launching a second group of optical signals having wavelengths $\lambda_{n+1}$ through $\lambda_{2n}$ into the fiber, wherein said second group of optical signals has a second polarization.

13. An optical transmitter for launching a plurality of optical signals having different wavelengths into an optical fiber for transport through a communications system, comprising:

means for launching a first group of optical signals having wavelengths $\lambda_1$ through $\lambda_n$ into the fiber, wherein said first group of optical signals have a first polarization; and means for launching a second group of optical signals having wavelengths $\lambda_{n+1}$ through $\lambda_{2n}$ into the fiber, wherein said second group of optical signals has a second polarization.

* * * * *